April 3, 1928.
J. LUSSE
1,665,103
VEHICLE CONTROLLING APPARATUS
Filed Oct. 3, 1922  5 Sheets-Sheet 4
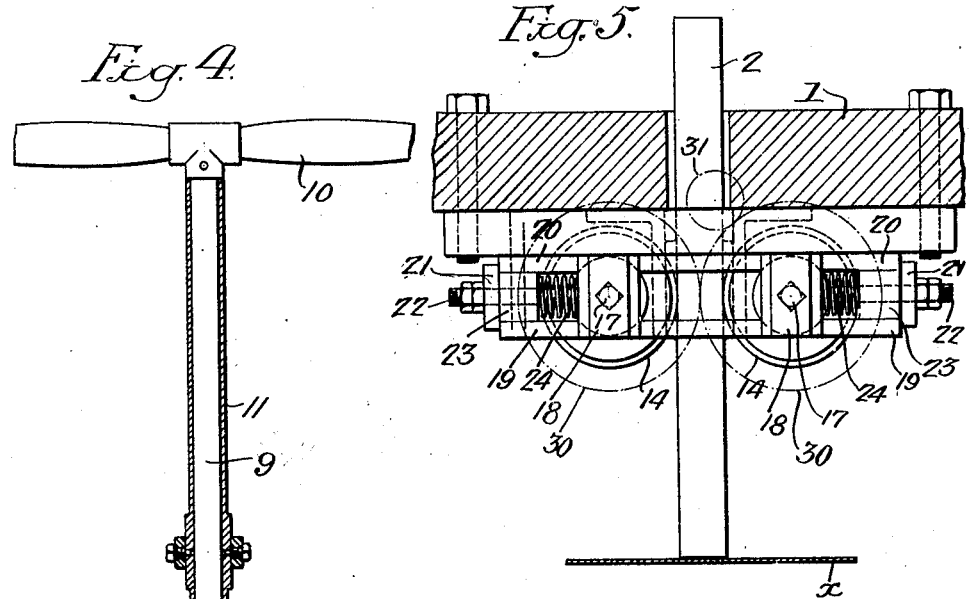
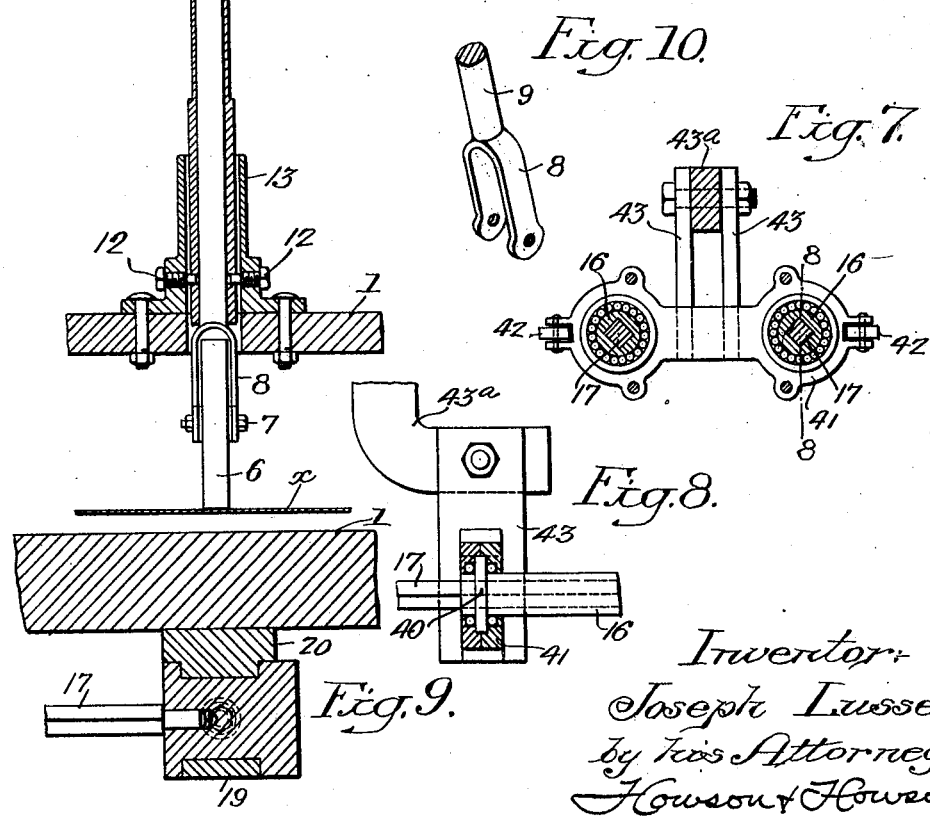
Inventor:
Joseph Lusse,
by his Attorneys,
Howson & Howson

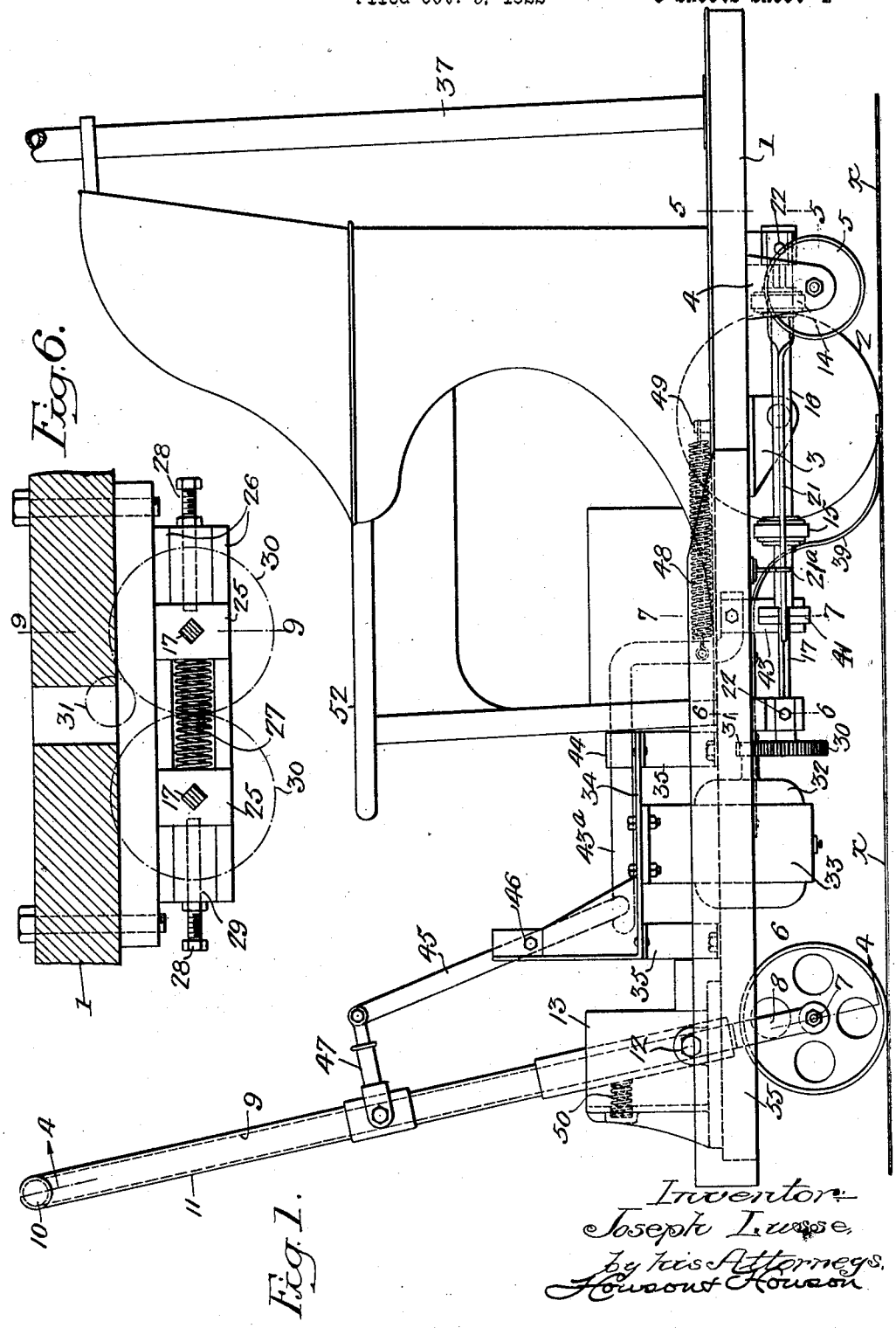

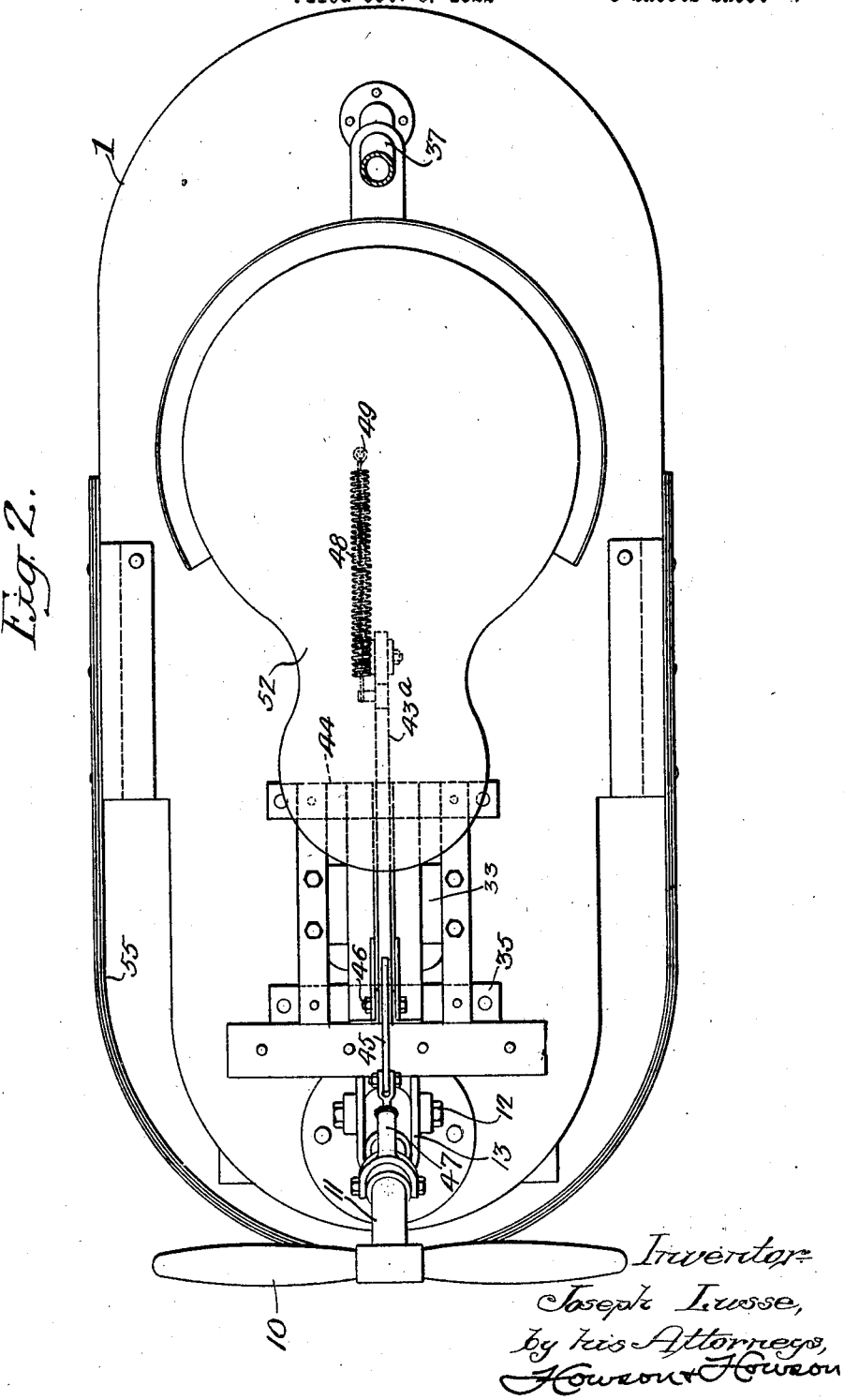

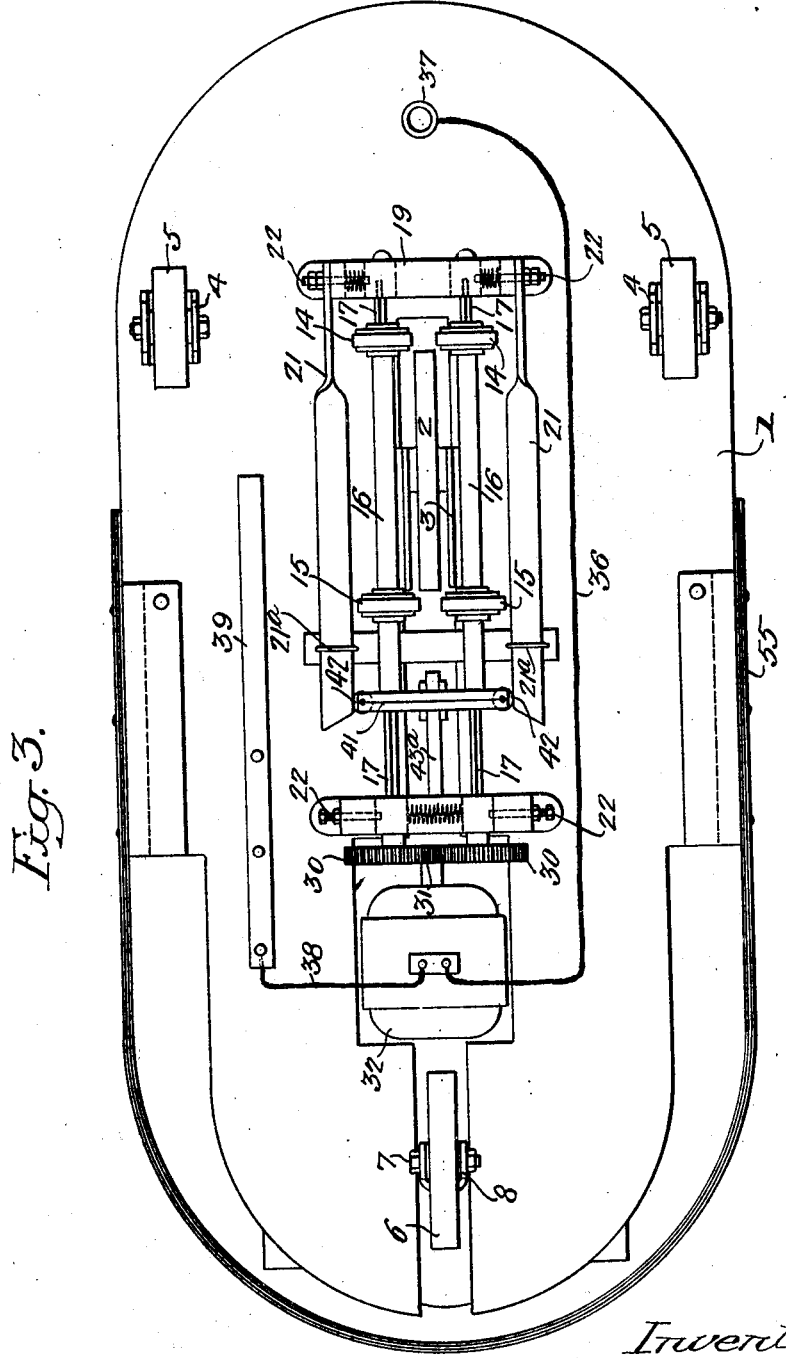

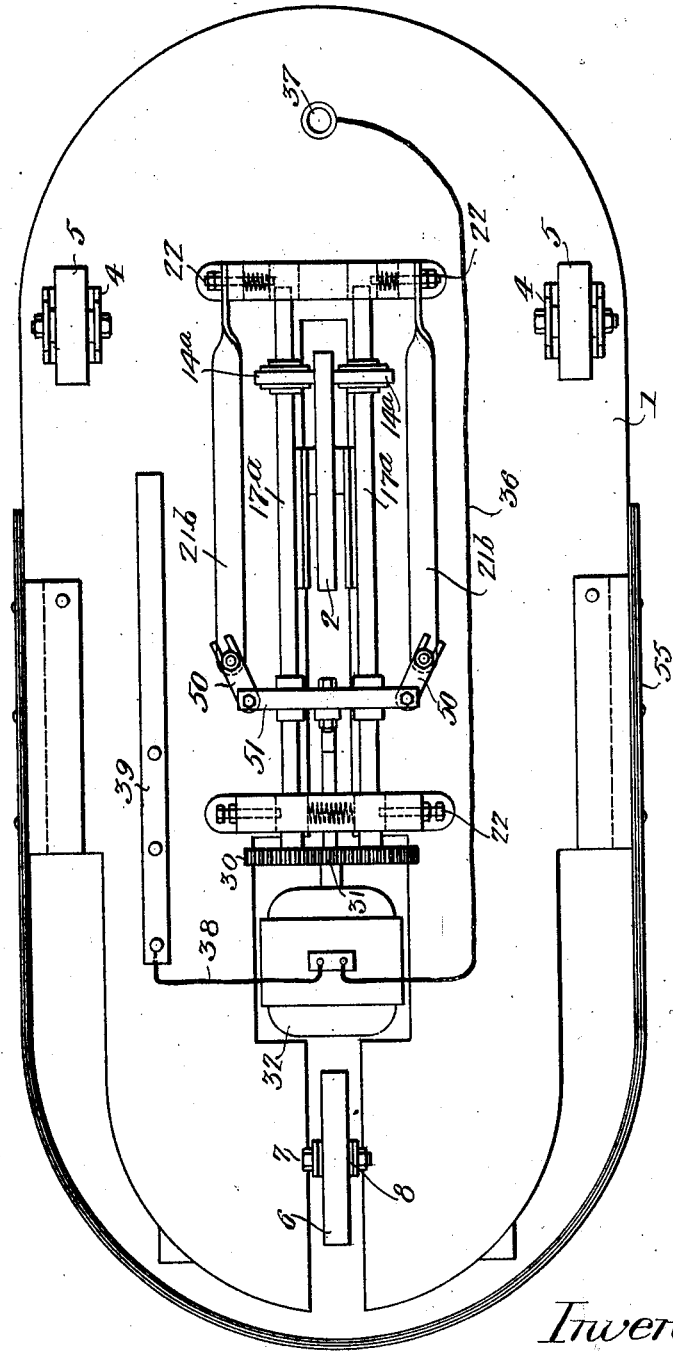

Patented Apr. 3, 1928.                                                          1,665,103

UNITED STATES PATENT OFFICE.

JOSEPH LUSSE, OF PHILADELPHIA, PENNSYLVANIA, ASSIGNOR TO THE FIRM OF LUSSE BROTHERS, OF PHILADELPHIA, PENNSYLVANIA, CONSISTING OF JOSEPH LUSSE AND ROBERT LUSSE.

VEHICLE CONTROLLING APPARATUS.

Application filed October 3, 1922. Serial No. 592,075.

My invention relates to motor driven vehicles, such as electric cars designed to carry one or more persons and commonly used in places of amusement such as parks, piers, or other places or structures provided with the necessary equipment.

One object of my invention is to provide a car of the above type with novel propelling mechanism and controlling apparatus, especially designed to permit the occupant or operator to easily govern both its speed and direction of movement.

Another object of my invention is to provide novel means for transmitting power from a suitable source, such as a continuously running electric or other motor to a driving wheel, the invention including mechanism for conveniently and quickly reversing the direction of rotation of said wheel.

I also desire to provide a novel device for steering a vehicle of the type above indicated, and, at the same time, controlling its speed.

Another object of my invention is to provide a novel form of change speed gearing, together with novel mechanism for controlling the same, the construction being relatively simple, substantial and not likely to get out of order, as well as relatively inexpensive to install and operate.

These objects and other advantageous ends I secure as hereinafter set forth, reference being had to the accompanying drawings, in which, Fig. 1 is a side elevation of a car constructed in accordance with my invention;

Fig. 2 is a plan of the car shown in Fig. 1;

Fig. 3 is an inverted plan of the under side of the car body with its associated mechanism;

Fig. 4 is a longitudinal section on the line 4—4, Fig. 1;

Figs. 5 and 6 are fragmentary vertical sections on a larger scale than the preceding figures, taken on the lines 5—5 and 6—6, Fig. 1;

Fig. 7 is a vertical section on line 7—7, Fig. 1;

Fig. 8 is a vertical section on line 8—8, Fig. 7;

Fig. 9 is a vertical section on line 9—9, Fig. 6;

Fig. 10 is a fragmentary perspective view of the lower end of the steering post; and Fig. 11 is an inverted plan similar to Fig. 3, showing a modification of my invention.

In the above drawings, 1 represents a body in the form of a generally flat platform whose rear end is normally supported on a single driving wheel 2. This wheel is journaled on a spindle carried in a pair of bearings 3 depending from the under side of said platform and projecting through the same in the central longitudinal plane of the car. The body at each side and somewhat to the rear of said driving wheel, has also mounted upon it a pair of steadying casters or auxiliary supporting wheels 5, preferably of less diameter than the wheel 2 and so carried in bearings 4 as to be above the plane of the ground or floor structure when the body 1 is level. If, however, said body tilts out of the horizontal beyond a predetermined angle, it is checked and supported by one or the other of said casters.

The front end of the body or platform of the car is supported on a single steering wheel 6, which, like the wheel 2, is mounted in the central vertical longitudinal plane of the car, being journaled on a suitable spindle provided by a bolt 7 extending between the forks 8 forming part of the lower end of a steering post 9. The latter has a horizontal projecting handle 10 on its upper end and is rotatably mounted in an elongated sleeve 11 pivotally supported on a pair of substantially horizontal trunnion bolts 12 mounted in a suitable bracket 13 fixed rigidly to and projecting upwardly from the platform or body 1. The trunnion bolts 12 are so mounted and the bracket 13 is so formed as to permit the sleeve 11, and with it the steering post 9, to be swung on said bolts either forwardly or back in the vertical central plane of the car from a neutral position, and the post 9 may be axially turned within the sleeve 11 by means of the handle 10 so as to adjust the wheel 6 to any desired angle to said plane in order to steer the car in any desired direction.

The rear or driving wheel 2 has plane parallel sides and is designed to be driven in one direction by a pair of suitable friction wheels 14—14, or in the opposite direction by a similar pair of friction wheels 15—15. One of the friction wheels 14 of one pair and one of the friction wheels of the second pair on the same side of the car are fixed to an elongated tubular spindle 16 which has a rectangular bore and which is longitudinally slidable upon a square shaft 17.

As shown in Fig. 5, the rear ends of these two square shafts 17 are mounted in bearing blocks 18 slidable between a pair of guides 19 and 20 hung from the end of the body 1 and separated by a pair of end members 23—23. Said bearing blocks 18 are respectively engaged by bolts 22—22 adjustably slidable through the end members 23, which serve as abutments for coil springs 24 respectively acting to force said bearing blocks, and with them the rear ends of the shafts 17, toward each other.

The outer ends of the bolts 22 have threaded upon them nuts serving to hold against the end members the ends of the longitudinally extending levers 21—21 whose forward ends are hung from the under side of the body 1 by yokes or straps 21ª so as to be capable of moving toward or from each other to a limited extent and thus moving the friction wheels into and out of gripping engagement with the driving wheel 2. By means of the nuts on the bolts 22—22, the tension of the springs 24 may be adjusted to vary the pressure of the rear pair of friction wheels 14—14 on the opposite plane faces of the driving wheel 2 when brought into contact therewith.

The front ends of the shafts 17 are rotatably carried in a second pair of bearing blocks 25—25 slidable toward and from each other in a pair of parallel guides 26—26, and have mounted between them a single coil spring 27. By means of bolts 28—28, adjustably mounted in abutments 29 at the opposite ends of the guides 26—26, the positions of the bearing blocks 25—25 may be adjusted at will to cause the front pair of friction wheels 15—15 to be capable of frictionally gripping the opposite plane faces of the driving wheel 2, it being noted that the friction wheels 14—14 cooperate with that portion of the driving wheel to the rear of the supporting spindle so as to turn said wheel in one direction, while the wheels 15—15 similarly cooperate with the portion of said driving wheel in front of its spindle to turn it in an opposite direction.

Mounted on the forward ends of the two shafts 17 are a pair of co-acting gears 30—30, of which one is engaged by a driving gear 31 on the armature shaft of an electric motor 32. This motor is supported from the body 1 in any suitable manner, as by a U-shaped frame member 33 carried by a pair of parallel bars 34 extending longitudinally of the platform and in turn supported upon a pair of frame members 35. Said motor 32 is designed to run continuously as long as the car is in service, being supplied with current through a conductor 36 running from a trolley pole 37 and being also connected through a conductor 38 with a spring contact shoe 39 in the form of a more or less resilient strip. Mounted on the underside of the body 1 at its lower and free end this shoe is designed to make electrical contact with the metallic floor on which the car operates. The trolley pole carries any desired or suitable form of current collector (not shown) designed to engage a metallic ceiling structure or other suitable form of conductor connected in circuit with a source of current supply which is likewise connected to the metallic floor.

As shown in Figs. 7 and 8 each of the tubular spindles 16, which, as noted, respectively carry the friction wheels 14—14 and 15—15, has fixed to it a flange or collar 40 engaged through suitable anti-friction bearings with one end of a two-part yoke 41. At its ends this yoke is provided with guide rollers 42 positioned to engage the adjacent edges of the two longitudinal levers 21—21 under operating conditions, and the middle part of this yoke has projecting upwardly from it a pair of parallel members 43 between which projects the rear end of a transmitting rod 43ª. Said rod is slidably supported in a bearing 44 so as to be movable longitudinally, and its forward end is operatively engaged by one arm of a lever 45 in the form of a straight bar fulcrumed at 46 to an upwardly extending fixed structure and having its upper end connected through a link 47 with the sleeve 11 on the steering post 9, the arrangement being such that a movement of said sleeve in a vertical plane will cause corresponding movement of the lever 45 and a longitudinal movement of the transmitting rod 43ª. By means of a spring 48 extending between a fixed post 49 on the platform 1 and the transmitting rod 43ª, this latter, and with it the tubular spindles 16—16 and their friction wheels are normally held in such positions that neither pair of said wheels engages the driving wheel 2. A second spring 50, mounted between the lower part of the sleeve 11 and its supporting bracket 13, assists in maintaining the steering post in and returning it to a neutral position after it has been moved forwardly therefrom.

The body or platform 1 is preferably provided with a suitable seat 52 for a single rider and this is constructed in any suitable manner, being usually positioned above or adjacent the driving wheel 2 and in front of the trolley pole 37. A suitable shock resisting bumper 55 is provided for the front of the body or platform 1, and this, in the present instance, consists of a number of parallel lengths of spring strip metal combined into a single structure constituting a curved buffer extended around the front of the body so as to be spaced away from the same, its ends being fixed to the opposite side edges of the said body.

Under conditions of use a number of cars constructed in accordance with the foregoing description are placed upon a metal covered surface or floor with their spring brushes 39 electrically engaging the same, there being also a continuous or other suitable form of metallic ceiling or conductor such as wire netting, (not shown) extending at a suitable distance above and substantially parallel with said floor at such a height therefrom as to be electrically engaged by the trolley wheel or other current collecting member of the trolley pole 37.

Current is then supplied to the electric motor 32 so that this is continuously operated, and, through the gears 31 and 30 and shafts 17, the two sets of friction wheels 14—14 and 15—15 are likewise rotated. The motor 32 is so connected that the friction wheels are turned in such a direction as to cause the car to be driven forward when, by a rearward swinging of the steering post, the tubular shafts 16 are moved forwardly to bring the friction wheels 14—14 into engagement with the driving wheel 2. The length of the cross bar 41 carrying the rollers 42 is such as to hold the levers 21 apart when they, with the steering post, are in the neutral position, and, upon the forward movement of the tubular spindles which brings these friction wheels opposite the driving wheel 2, said rollers move out of engagement with the ends of said levers, thereby permitting these to move toward each other. This permits the springs 24 to force the bearing blocks 18 and their shafts 17 toward each other with the result that said friction wheels are brought into gripping engagement with the sides of the driving wheel.

Obviously the speed of the latter and hence of the car will depend upon the extent of movement of steering post from its neutral position, since the friction wheels will turn the driving wheel faster as they are moved toward its supporting spindle. At the same time that the steering post is pulled back to the extent desired to secure any available forward speed of the car, said post may be rotated to steer said car in any desired direction, and when its is desired to stop, the post is either released or moved toward its neutral position under the action of the spring 48, whereupon the sleeves 16 are moved to the rear, the rollers 42 engage the levers 21 so that the friction wheels 14 are disengaged from and moved to the rear of the driving wheel.

When the steering post is moved forwardly from its neutral position against the action of the spring 50, the sleeves 16 are caused to slide to the rear on the square shafts 17 so that the friction wheels 15—15 are brought into engagement with the forward portion of the driving wheel 2. As a consequence, the latter is turned in a direction opposite that caused by the friction wheels 14 and the car is driven backward. As before, when the steering post is released, it is automatically returned to its neutral position and the friction wheels 15—15 are disengaged from the driving wheel.

If it is desired to simplify the driving and controlling mechanism, this may be accomplished by the arrangement of parts shown in Fig. 11, wherein the motor 32 is caused to continuously drive in opposite directions a pair of parallel shafts $17^a$ supported by the same devices as are the shafts 17. In this case, however, said shafts $17^a$ have fixed to them two oppositely placed friction wheels $14^a$ normally disengaged from but rotating immediately adjacent the opposite faces of the driving wheel 2. Substantially parallel levers $21^b$ are mounted on the bolts 22 and are similar to the levers 21 previously described except that their forward ends are pivotally connected with links 50, which are also both pivoted to a cross bar 51, in turn connected to the transmitting member $43^a$ by the members 43 or their equivalents. As a result of this construction, as long as the steering post is in its neutral position the cross bar 51, through the links 50, holds the levers $21^b$ apart, so that, through the bolts 22, the friction wheels $14^a$ are maintained out of contact with the driving wheel.

If, however, the steering post be moved to the rear, the cross bar 51 is moved forwardly and the levers $21^b$ are permitted or caused to approach each other, thereby causing the friction wheels $14^a$ to be brought into gripping engagement with the driving wheel 2 under the action of the springs 24. In this case there is no possibility of varying the speed of the car, since the distance of the friction wheels from the axis of rotation of the driving wheel is fixed.

When it is desired to stop the car, the return of the steering post to its neutral position causes the cross bar 51 to be moved to the rear and, through the link 50, separate the forward ends of the levers $21^b$, thus swinging outwardly the rear ends of the shafts $17^a$ and disengaging the friction wheels $14^a$ from the driving wheel.

I claim:

1. The combination of a car having a seat; steering means for said car including a rotary post mounted to swing toward and from the seat and adapted to provide a mounting for a steering wheel; driving mechanism including a traction wheel and a co-operating friction element, said element being movable relative to said wheel to vary the driving effect of the former; and controlling means for said friction element adapted to cause said relative movement upon the swinging of said post.

2. The combination of a car; a driving wheel and a steering wheel for said car; a rotary swinging steering post mounted on the car and having the steering wheel journalled therein; a motor; with speed varying means connected between the motor and the driving wheel and actuated by a swinging movement of the steering post.

3. The combination of a car body; a member mounted on said body to swing on a horizontal axis; a steering post mounted in said member and having a fork at its lower end; a steering wheel journalled in said fork; a driving wheel at the rear of the car body; a motor; means for operatively connecting the driving wheel and the motor; and means for varying the speed of the driving wheel connected to be actuated by the swinging of said member.

4. The combination of a car body; a steering post horizontally pivoted so as to be capable of swinging both forward and back from a neutral position; a motor; with driving means actuated by the motor and connected to be controlled by movement of the steering post, said driving means including a traction element and co-operating friction elements for successively causing the car to move in opposite directions, one of said elements only being effective when said post is moved from its neutral position.

5. In a car, the combination with a steering wheel for said car; of a rotary swinging steering post mounted on the car having said steering wheel journaled therein; a driving motor; a traction element for driving said car; and control means connected between said motor and said traction element actuated by a swinging movement of said steering post.

6. In a car, a motor; a traction wheel for driving said car; a revoluble friction element driven by said motor and having a lateral movement into and out of engagement with said traction wheel; means for establishing a frictional engagement between said friction element and said traction wheel, said friction element operating independent of said traction wheel when the torque on the latter exceeds a predetermined value; and steering means for the car adapted to control the lateral movement of said friction element, said steering means including a rotary swinging steering post and a wheel journaled therein.

7. In a car, a traction wheel for driving said car; a driven shaft; a friction element on said shaft, laterally movable supporting means for one end of said shaft; permitting a lateral movement of said friction element into and out of engagement with said traction wheel; means for normally resiliently holding said friction element in engagement with said traction wheel; a steering element; and means including a fulcrumed lever operatively associated with said steering element and said supporting means, whereby motion of the steering element causes a corresponding motion of the friction element out of engagement with said traction wheel.

8. In a car, a traction wheel for driving said car; a driven shaft; a friction element on said shaft; a block carrying one end of said shaft; a laterally extending guideway for said block providing for a lateral movement of said friction element into and out of engagement with said traction wheel; an abutment at one end of said guideway; a spring extending between the same and said block, whereby the friction element may be forced into engagement with said traction wheel; a fulcrumed lever; a movable steering post; and mechanism for so interconnecting said steering post and said lever that motion of said steering post causes disengagement of said friction element and traction wheel.

9. In a car, a traction element for driving said car; a driven shaft; a friction element on said shaft; a block carrying one end of said shaft; a laterally extending guideway for said block providing for a lateral movement of said friction element into and out of engagement with said traction element; an abutment at one end of said guideway; a spring extending between the same and said block, whereby the friction element may be forced into engagement with said traction element; a lever; a movable steering post; and resilient means for normally so holding said post as to cause disengagement of said friction and traction elements.

10. In a car, a traction wheel for driving said car; a driven shaft; a friction element on said shaft; a block carrying one end of said shaft; a laterally extending guideway for said block providing for a lateral movement of said friction element into and out of engagement with said traction wheel; an abutment at one end of said guideway; a spring extending between the same and said block, whereby the friction element may be forced into engagement with said traction wheel; a lever fulcrumed on said abutment and provided with a rod interconnecting the same and said slidable block; a movable steering post; and mechanism for so interconnecting said steering post and said lever that motion of the former in opposite directions causes corresponding movements of the latter to effect the disengagement of said friction element and traction wheel and to permit said spring to return said friction element to its original position, respectively.

11. In a car; a traction wheel for driving said car; a driven shaft; a friction element on said shaft; a block carrying one end of said shaft; a laterally extending guideway for said block providing for a lateral movement of said friction element into and out of engagement with said traction wheel; an abutment at one end of said guideway; a spring extending between the same and said block, whereby the friction element may be forced into engagement with said traction wheel; a lever fulcrumed on said abutment and provided with a rod interconnecting the same and said slidable block; a rotary swinging steering post; mechanism for so interconnecting said steering post and said lever that bodily movement of the former causes corresponding movements of the latter to effect the disengagement of said friction element and traction wheel and to permit said spring to return said friction element to its original position, respectively; and resilient means for normally so holding said steering post as to effect a disengagement of said friction element and said traction wheel.

12. In a car, the combination with bodily movable steering means; of a driving wheel; a motor; a revoluble friction element driven by said motor and movable into and out of engagement with said driving wheel; and means for so operatively associating said steering means and said friction element that a bodily movement of the former causes a movement of the latter into and out of engagement with said driving wheel.

JOSEPH LUSSE.